Sept. 26, 1933.  F. W. SCHEFFLER  1,928,114
ANTIFRICTION BEARING
Filed March 18, 1932  2 Sheets-Sheet 1
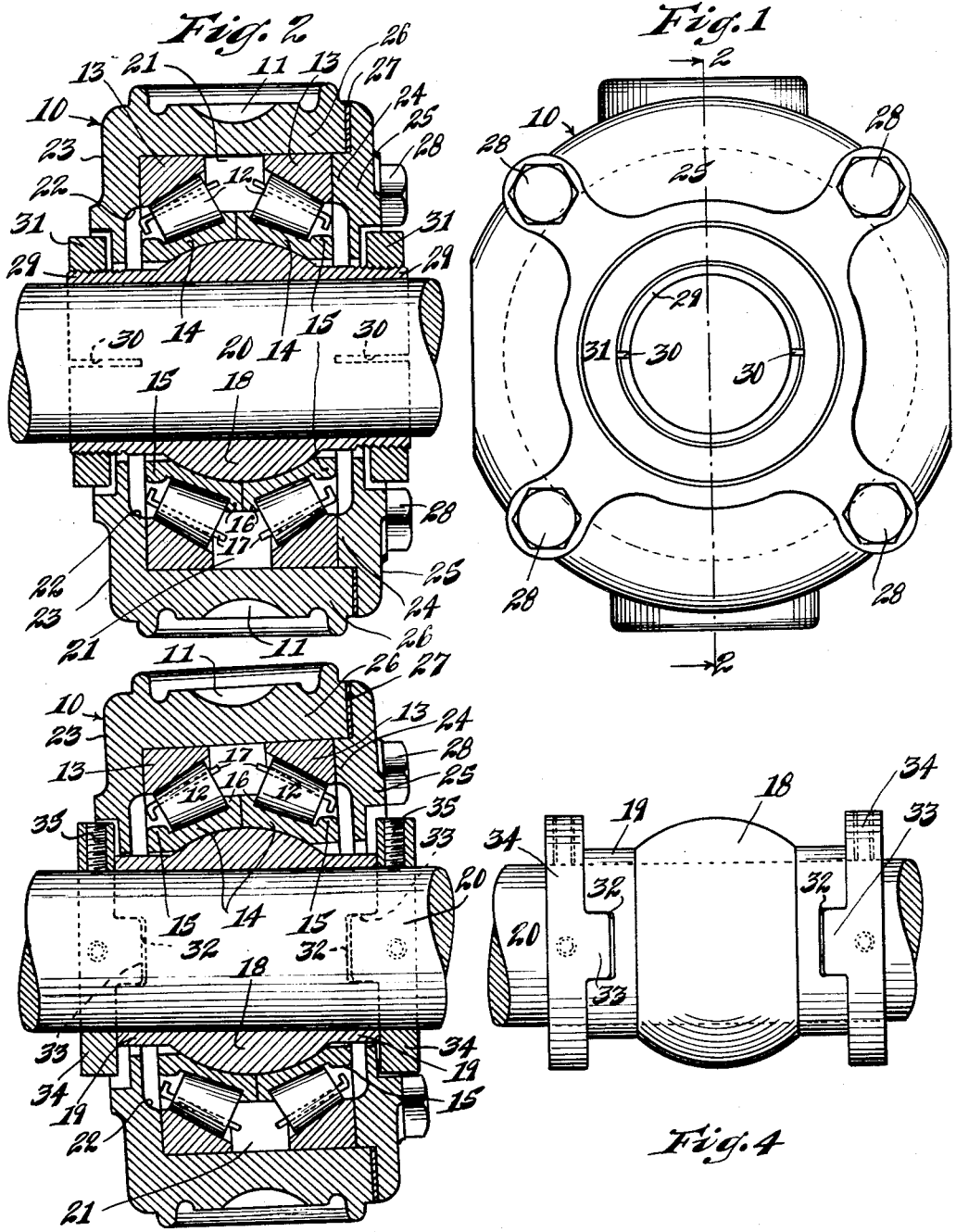

Sept. 26, 1933.    F. W. SCHEFFLER    1,928,114
ANTIFRICTION BEARING
Filed March 18, 1932    2 Sheets-Sheet 2
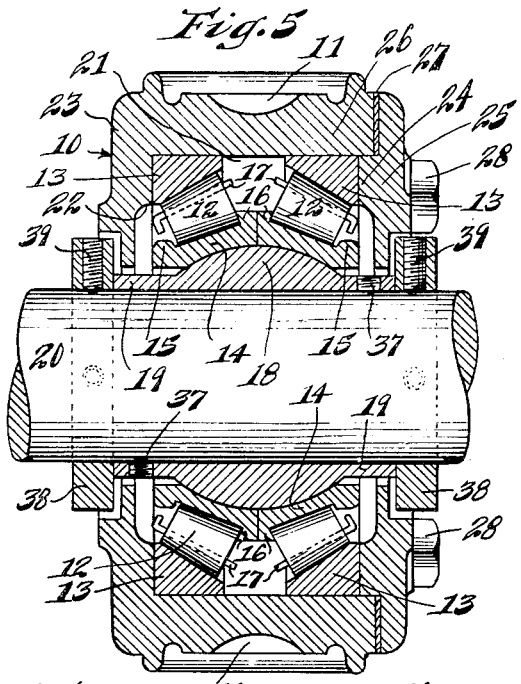
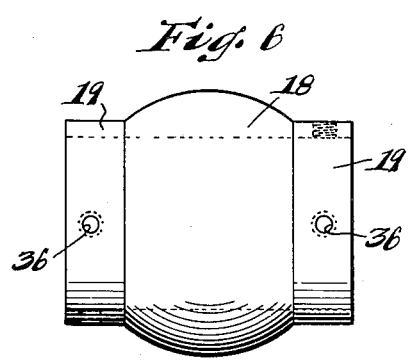
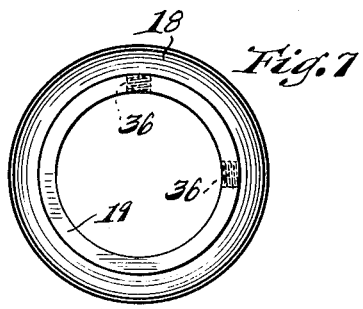
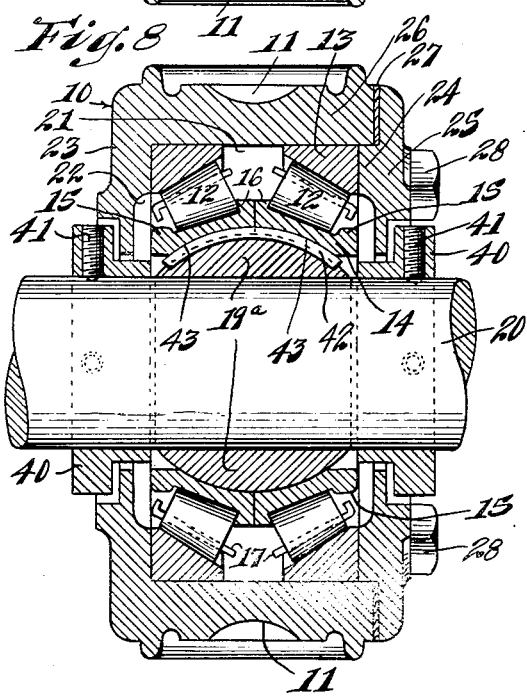
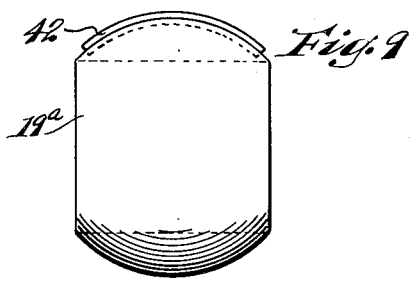
Witnesses:
E. E. Wessels
F. C. Appleton
Inventor:
Frederick William Scheffler,
By Joshua R. H. Potts
his Attorney.

Patented Sept. 26, 1933

1,928,114

UNITED STATES PATENT OFFICE 1,928,114

ANTIFRICTION BEARING

Frederick William Scheffler, Joliet, Ill.

Application March 18, 1932. Serial No. 599,635

3 Claims. (Cl. 308—207)

This invention relates to antifriction bearings, and has more particularly to do with self-alining bearings of the roller or ball type. It has for its principal object to improve generally upon bearings of this character and to attain high efficiency in a simple and practical structure which is easily assembled and adjusted. Other particular objects and advantages to be attained will hereinafter more fully appear.

The invention consists in the novel general construction, and in the several parts and combinations and arrangements of parts as hereinafter described and set forth with particularity in the appended claims.

In the accompanying drawings, illustrating practical adaptations of the invention,—

Fig. 1 is an end elevation of a hanger box type of bearing, illustrative of one adaptation of the invention;

Fig. 2 is a section on the line 2—2 of Fig. 1, a fragment of a shaft being shown in place;

Fig. 3 is a sectional view, similar to Fig. 2, of a modification of the invention, the housing of the bearing being tilted with relation to the shaft to illustrate the action of the bearing in compensating for disalinement of the shaft;

Fig. 4 is a detail view of the shaft and its directly associated elements detached from the bearing assembly;

Fig. 5 is a sectional view, similar to Figs. 2 and 3, illustrating another modification of the invention;

Fig. 6 is a detail view of the shaft alining element detached;

Fig. 7 is an end view of said last named element;

Fig. 8 is a sectional view illustrating a still further modification; and

Fig. 9 is a detail view of the shaft alining element detached.

Referring now to the drawings, the bearings illustrated are of the hanger box type, or, in other words, of the kind that are employed in installations of line shafting and the like, wherein the bearings are supported from hanger brackets or pedestal frames. In bearings of this particular kind the housings, designated generally by the numeral 10 in the drawings, are provided with oppositely disposed sockets or seat portions 11 for the engagement of the usual adjusting screws provided on the hanger brackets or pedestal frames to adjustably support the bearings. In the particular adaptations of the invention as illustrated in the drawings, rollers 12 of the frusto-conical type are employed, but, obviously, as far as the essential features of the invention are concerned, rollers of other known shapes as well as balls or spheres may be employed as the antifriction elements.

As shown, each bearing comprises a companion pair of antifriction bearing assemblies, each assembly including an annular outer member or ring 13, and an inner ring 14. For the particular type of bearing illustrated the outer ring 13 has a beveled inner face or raceway, while the inner ring 14 has a correspondingly beveled outer face or raceway for the travel of the interposed antifriction rollers 12. Each of the inner bearing rings 14 is provided with a beveled annular shoulder 15 at its outer margin, while the meeting inner marginal portions of said rings are provided with undercut shoulders 16. Each of said bearing assemblies is preferably provided with a suitable cage 17, shown more or less diagrammatically and without special detail, for spacing the rollers 12 in a well known manner.

The ring members 14 are internally concaved to fit the circumferential face of a spherical middle portion 18 of a sleeve 19 constituting an alining element for a shaft or spindle 20, said alining element 19 being fastened to the shaft or spindle 20 in a manner as will be hereinafter more fully described. The two antifriction bearing assemblies including the rings 13 and 14 and interposed series of rollers 12, when assembled, constitute, in effect, an annularly split bearing comprising two counterpart separable elements which are readily brought laterally together upon the spherical portion 18 of the shaft or spindle alining element 19, and being held in assembled working relation to the latter in a manner now to be described. As shown, the housing 10 has a circular chamber 21 in which the outer rings 13 of the bearings have a snug slidable fit, one of the rings abutting an annular shoulder 22 on the integral end wall 23 of the housing, the opposite bearing ring 13 being engaged by an annular shoulder or abutment 24 formed on the inner side of the removable end wall 25. Interposed between the end wall 25 and the annular wall 26 of the housing 10 is a gasket or washer 27, said end wall 25 being held in place by a series of bolts 28.

In the modification illustrated in Figs. 1 and 2 of the drawings, the shaft alining sleeve or element 19 has its annular end portions 29 slotted, as at 30, the circumferences of said end portions 29 being preferably tapered slightly and screw-threaded to receive counterpart threaded nuts 31, by which provision the sleeve is clamped tightly to the shaft or spindle 20. By this arrangement the shaft alining sleeve or element 19 is readily adjusted lengthwise of the shaft or spindle 20 and releasably clamped in place by merely tightening the nuts 31.

Different means may be employed for adjusting and securing the shaft alining sleeve or element 19 on the shaft or spindle 20, as shown in Figs. 3 and 4 of the drawings, in which modification the sleeve is provided with rectangular notches or recesses 32 in its opposite end portions for the reception of counterpart lugs 33 provided therefor on collars 34, said collars being slidably fitted to the shaft or spindle 20 and locked in place thereon, by set screws 35, in abutting relation to the ends of the element 19, by which provision said element 19 is not only held against independent rotative movement on the shaft or spindle 20, but is at the same time held against endwise movement thereon.

In Figs. 5 to 7, inclusive, a further modification is illustrated wherein the shaft alining sleeve or element 19 is provided with screw-threaded openings 36 in its opposite end portions for the reception of set screws 37 which impinge on shaft or spindle 20 and lock the element 19 against independent rotative and endwise movement thereon. As a further prevention against endwise movement of the element 19 on the shaft or spindle 20, collars 38 are fitted on the shaft or spindle 20 in abutting relation to the ends of the element 19 and secured in place by set screws 39.

While it is preferable to provide the shaft or spindle 20 with removable and adjustable alining elements 19, as illustrated in Figs. 1 to 7, inclusive, it may be desirable in some cases to permanently locate or integrally produce the alining element on the shaft. As an illustration of this application of the alining element, the spherical element 19ᵃ is slipped on the shaft, as shown in Fig. 8, and is shrunk in place or otherwise secured by a sweating or other approved process. In instances of this kind the shaft or spindle 20 may be provided with supplement collars 40 having reduced annular portions at their inner sides to abut the adjacent ends of the shaft alining element 19ᵃ, and being secured in adjusted position by set screws 41. As shown in Figs. 8 and 9, the spherical circumferential portion of the shaft alining element 19 or 19ᵃ, as the case may be, may be provided with an arcuate key or spline 42, and the ring members 14 provided with counterpart arcuate grooves 43 to freely fit said key or spline whereby the shaft or spindle 20 is permitted a disalining angular set with respect to the bearing, and yet the ring members 14 are positively rotated with the element 19 or 19ᵃ, as the case may be.

By the provision of the alining sleeve or element 19 or 19ᵃ, and the cooperating concaved inner rings 14 of the antifriction bearing assemblies, the shaft or spindle 20 is obviously permitted considerable disalinement without detracting from the effective antifriction qualities of the bearing; but there is a further, and as important, advantage in the provision of the inner bearing rings 14, in that any form of roller or a ball may be substituted for the particular conical roller 12 illustrated in the drawings without detracting from the efficiency of the bearing, nor departing from the spirit and scope of the invention, which permits even further modification within the purview of the appended claims defining the invention. The invention, therefore, is not limited to the precise details of construction shown in the accompanying drawings.

Having thus described my invention, what I claim as new and desire to secure by Letters Patent is:

1. In a bearing of the character described, a supporting housing having a circular cavity therein, a pair of opposed, laterally separable, cooperating antifriction bearing assemblies comprising reversely disposed, like outer ring members fitted circumferentially to the circular wall of said housing cavity, reversely disposed, like inner bearing rings, and antifriction rollers interposed between said inner and outer rings, said inner rings having circumferentially channeled raceways for said antifriction rollers and spherically concaved inner portions, a shaft alining element having a spherical circumferential portion to which the concaved portions of said inner bearing rings are movably fitted, and means for retaining said outer ring members of the bearing assemblies in said supporting housing against relative longitudinal movement.

2. In a bearing of the character described, a supporting housing having a circular cavity therein, a pair of opposed, laterally separable, cooperating antifriction bearing assemblies comprising reversely disposed, like outer ring members fitted circumferentially to the circular wall of said housing cavity, reversely disposed, like inner bearing rings, and antifriction rollers interposed between said inner and outer rings, said inner rings having circumferentially channeled raceways for said antifriction rollers and spherically concaved inner portions, a shaft alining element having a spherical circumferential portion to which the concaved portions of said inner bearing rings are movably fitted, key means interposed engageably between said shaft alining element and said inner bearing rings whereby the relative movement of the parts is limited to rotation about an axis transversely of the longitudinal axis of the shaft alining element, and means for retaining said outer ring members of the bearing assemblies in said supporting housing against relative longitudinal movement.

3. In a shaft or spindle bearing, the combination of a shaft, a spherical alining element fixed on said shaft, an outer supporting housing having a cylindrically walled chamber therein, a pair of longitudinally opposed outer bearing ring members having cylindrical peripheral portions fitted to the cylindrical wall of the chamber of said outer supporting casing and beveled annular inner faces, reversely disposed inner bearing ring members, the inner end portions of which abut each other, said inner bearing ring members having beveled peripheral faces in cooperatively opposed relation to the respective beveled faces of said outer ring members and being provided with peripheral annular shoulders adjacent their inner and outer edges, the inner annular faces of said inner ring members being spherically grooved to fit said spherical alining element of the shaft, conical bearing rollers interposed between said outer and inner ring members, and means for retaining said outer ring members against relative longitudinal movement in the chamber of said outer supporting housing.

FREDERICK WILLIAM SCHEFFLER.